United States Patent [19]

Dent, Jr.

[11] 4,049,415  
[45] Sept. 20, 1977

[54] APPARATUS FOR FORMING GLASS FIBERS  
[75] Inventor: Joseph B. Dent, Jr., Lexington, N.C.  
[73] Assignee: PPG Industries, Inc., Pittsburgh, Pa.  
[21] Appl. No.: 707,967  
[22] Filed: July 23, 1976  
[51] Int. Cl.² .......................................... C03B 37/02  
[52] U.S. Cl. .................................... 65/11 W; 65/12  
[58] Field of Search ................. 65/2, 11 W, 12, 5, 16, 65/3 R

[56] References Cited  
U.S. PATENT DOCUMENTS

| | | | |
|---|---|---|---|
| 3,271,122 | 9/1966 | Denniston et al. | 65/12 X |
| 3,304,163 | 2/1967 | Holschlag | 65/12 X |
| 3,558,293 | 1/1971 | Zurheide | 65/12 X |

Primary Examiner—Robert L. Lindsay, Jr.  
Attorney, Agent, or Firm—Alan T. McDonald; John E. Curley

[57] ABSTRACT

An improved method for the formation of glass fiber strands is disclosed. Air passing downwardly with the filaments is prevented from returning to the region directly below the bushing and thus prevented from causing air turbulence below the bushing. This is accomplished by venting air which strikes the floor of the filament formation level of a double level filament forming and winding operation away from the region under the bushing. By preventing air turbulence below the bushing, improved filament formation can be achieved.

1 Claim, 1 Drawing Figure

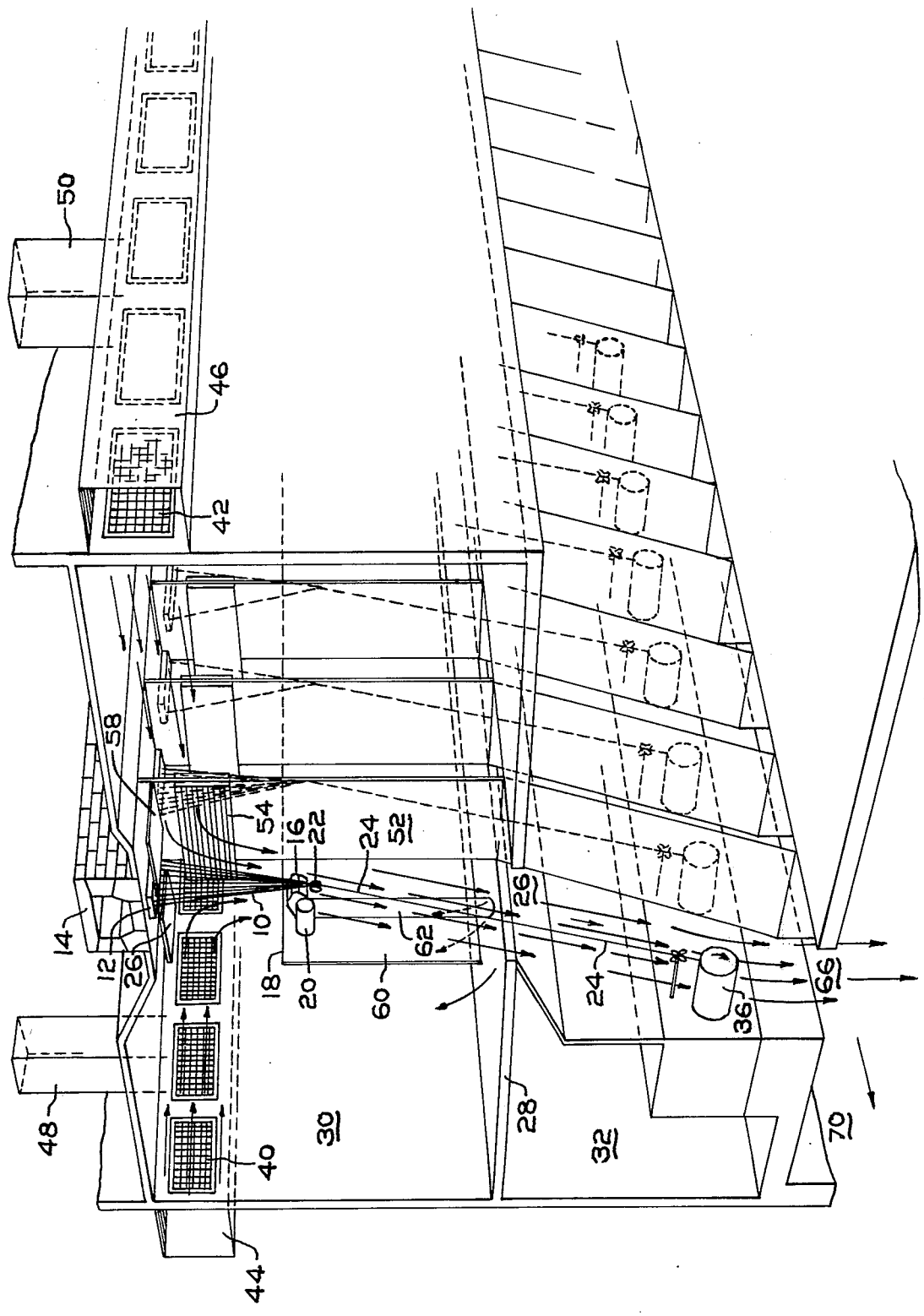

APPARATUS FOR FORMING GLASS FIBERS

BACKGROUND OF THE INVENTION

Glass fiber strands are typically formed by attenuating glass filaments through bushing tips or orifices at the bottom of a heated bushing containing molten glass. The filaments are then passed across the application surface of an applicator where they are coated with a binder and/or size. The filaments are then passed within the groove of a gathering shoe, which is typically a grooved cylinder or wheel formed of a material such as graphite, where the filaments are combined into one or more unified strands. The strands are then collected on a rotating drum or collet as a forming package.

In the past, it has been found advantageous to form the filaments and strand at one forming level and to collect the thus formed strand on a second forming level. This double-level operation has improved the quality of strand produced.

However, a major problem in the formation of quality glass strands remains in controlling the environment at and directly below the bushing. It is well known that as the filaments are attenuated through the bushing at high speeds, typically ranging from about 2,000 to 20,000 feet per minute (609.6 to 6096 meters per minute), that air is aspirated downwardly with the filaments at high speed.

The majority of the air aspirated downwardly passes through an opening in the floor separating the filament and strand formation level from the strand collection level. However, some of the air strikes the floor separating these levels. The air striking the floor has, in the past, had no place to go but to return towards the bushing. Behind the applicator is a metal deflector shield which runs from slightly above the applicator to the floor to help direct the air downwardly and to thus help prevent turbulent flow. On either side of the forming position are side shields to separate one forming position from the other. At the front of the forming position is a small region in which the operator may work, however, this region has a wall enclosure at its front. Thus, the only direction which the air striking the floor of the strand formation level to go is to return towards the bushing.

The return of this air causes turbulent air flow in the region directly below the bushing. Turbulent air flow is non-uniform air flow and leads to non-uniform temperature conditions directly below the bushing. Since filament diameters are directly proportional to glass viscosity for a given bushing tip size and since glass viscosity is directly proportional to the temperature of the glass at each orifice, variations in temperature in the region directly below the bushing produces uneven diameter strands. If severe enough, the temperature conditions may even produce filament breakouts. In addition, if the air turbulence is severe enough, the turbulence alone may cause filament breakouts.

Thus, it is desirable to maintain a uniform air flow and a uniform air temperature environment in the region directly below the bushing.

The Present Invention

By means of the present invention, turbulence caused from air returning towards the bushing after striking the floor of the filament and strand formation level can be substantially reduced or eliminated. The present invention involves venting the air striking the floor of the filament forming level away from the forming position and towards the rear of the filament forming room such that the air will be prevented from returning to the region directly below the bushing.

To accomplish this result, the deflector shield located behind the applicator which is employed to direct the air downwardly with the filaments and which had previously been located from slightly above the applicator to the floor is now provided with an opening or vent located from the level of the floor to a level slightly above the floor. Thus, the air striking the floor now has a path away from the filament forming region and thus does not "bounce" off the floor and back to the area directly below the bushing.

BRIEF DESCRIPTION OF THE DRAWING

The air venting system of the present invention will be more fully described with reference to the drawing which is a perspective view of a double-level glass fiber forming operation including the air venting system of the present invention.

DETAILED DESCRIPTION OF THE DRAWING

Turning to the FIGURE, it will be readily realized that each forming position is similar in its design and organization. Thus, only a single position will be described, with it being understood that this description will suffice for the balance of the positions.

Glass filaments 10 are attenuated from bushing tips located at the bottom of a heating bushing 12. The bushing 12 is connected to the forehearth 14 of a glass furnace (not shown) through which molten glass is supplied to the bushing 12. The filaments 10 pass across the application surface 16 of an applicator 18. As illustrated, the applicator 18 is a roller applicator with the roller 16 being rotated by a motor 22. While the applicator 18 is illustrated as a roller applicator, it is obvious that the applicator 18 could be a belt applicator, pad applicator, or the like. Filaments 10 then pass across the face of a gathering shoe 22 where they are combined into a unified strand 24. The strand 24 passes through an opening 26 in the floor of the filament and strand forming level 30 and to the collection level 32. The strand 24 then passes across the face of a rotating spiral 34 wherein it is traversed and collected as a forming package on the winder 36.

The bushing 12 is supplied air from a pair of grills 40 and 42. This air supply system is more fully described in concurrently filed application Ser. No. 707,985 of David M. Long and Joseph B. Dent, Jr., which is incorporated herein by reference. Grill 40 is connected to a supply duct 44 and grill 42 is connected to a supply duct 46. These ducts are supplied with conditioned air from ducts 48 and 50, respectively.

The air flowing from the grills 40 and 42 are adjusted to provide a constant velocity of air at the bushing from both the front and rear of the bushing. This velocity can range from about 50 to about 150 feet per minute (15.24 to 45.72 meters per minute) and preferably between 50 and 100 feet per minute (15.24 to 22.86 meters per minute).

The forming positions are separated from one another by separator plates 52. Connected to these plates are cooling panels 54. The cooling panels 54 are more fully described in concurrently filed application Ser. No. 707,986 of Joseph B. Dent, Jr., Howard M. Bennett and Walter L. Martin, which is also incorporated herein by reference. As described in this copending application, a cooling panel 54 is located on each side of the bushing 12 and below it. The panel provides cooling to the environment below the bushing from the sides of the bushing 12 and helps to maintain a more uniform temperature environment therein. In addition, this panel is connected to cooling plates 56 and 58 as well as fin coolers for the bushing, terminal clamps for supplying electricity to the bushing 12, and other equipment in need of cooling, such as a cooling ring embedded in the refractory surrounding the metal bushing (all not shown). As disclosed in the copending application, this reduces the clutter common in the bushing region and has aided in opening up the region surrounding the bushing, which has helped in allowing for a more uniform air flow at the bushing.

The air flowing from thr grills 40 and 42 reach the bushing 12 in laminar flow from both the front and the rear. As the air reaches the bushing, it is aspirated downwardly with the filaments 10 and the majority of the air passes through the opening 26 to the strand collection level 32. Some of the air strikes the floor 28. In the past, this air has "bounced" off the floor 28 and back up into the region below the bushing, creating a turbulent air flow. However, according to the present invention, a plate 60 is provided which is connected to a stand at 62 for the applicator 18. This plate 60 has an opening at its bottom which allows an air "bouncing" off the floor 28 to escape through the opening between it and the floor 28. The vent opening may range in height from about 3 to 8 inches (7.62 to 20.32 centimeters). Preferably, this opening is about 5 inches (12.70 centimeters) in height. This air is thus vented away from the bushing region and thus does not return to the area directly below the bushing to cause turbulent air flow therein. The air returns rearwardly towards the grill 40 and is aspirated back to the air stream flowing towards the bushing 12 in laminar flow. Thus, turbulent air flow at the bushing has been substantially reduced or eliminated.

The air flowing through the opening 26 passes downwardly with the strand 24 to the collet 36. Collet 36 is rotating in a clockwise direction which produces a negative air pressure to its right and forces the air to its right and downwardly through the waste chute 66 to the waste collection area 70 which is connected to the recirculation system for the conditioned air (not shown).

Example

DE-150 bushings having 400 orifices each were operated for a period of 35 days at a speed of approximately 14,000 feet per minute (4263 meters per minute). These bushings were operated with air supplied from grills 40 and 42 flowing horizontally across the bushing. The air striking the floor of the filament forming level was vented from the bushing region by providing an opening in the rear deflector plate 60 of 5.0 inches (12.7 centimeters) in height. The bushings employed are designed to wet pull 36.9 pounds of glass per hour (16.7 kilograms per hour) when operating efficiently.

During the 35 day span, the bushings averaged 37.0 pounds per hour of wet glass pull (16.8 kilograms per hour), a 100.3 percent job efficiency. During this time period, the percentage of calldowns, i.e., the percentage of complete forming packages produced without a strand breakage was 63.8 percent.

In comparison, identical DE-150 bushings were operated during the same time period and at the same rate on another double-level forming operation without the air venting system of the present invention. During the 35 day period, the average wet pull per hour for these bushings was 30.7 pounds per hour (13.9 kilograms per hour). This converts to a job efficiency of 83.1 percent. During this time period, the percentage of calldowns for these bushings was 33.9 percent.

Thus, the filament forming positions employing the present invention showed an increase in both the amount of glass produced and the amount of packages formed without a breakage occurring. This illustrates the improvement in the quality of glass strand produced by the employment of the present invention.

While the invention has been described with reference to a specific embodiment thereof, it is not intended to be so limited thereby except as set forth in the accompanying claims.

I claim:

1. In an apparatus for forming glass fibers strands comprising a first level having therein a bushing having bushing tips through which filaments are attenuated, means for providing an air stream across the bushing, means for applying a binder and/or size to the filaments, means for gathering the filaments into a unified strand and a back shield member behind said means for applying the binder and/or size and said means for gathering the filaments, a second level having therein a means for collecting said strand and a floor separating said first level and said second level, said floor having an opening provided therein through which a majority of said air stream is aspirated downwardly with said filaments and said strand through said opening, the improvement wherein said back shield includes an opening therein extending upwardly from said floor, said opening being of a sufficient height to vent the portion of said air stream which strikes the floor of said first level and thus does not pass through said opening downwardly with said strand and to allow said portion of said air stream to be aspirated back into said air stream to thereby prevent return of said portion of said air stream to the region directly below the bushing and thereby prevent turbulent air flow below the bushing.

* * * * *